US008175384B1

(12) United States Patent
Wang

(10) Patent No.: US 8,175,384 B1
(45) Date of Patent: May 8, 2012

(54) METHOD AND APPARATUS FOR DISCRIMINATIVE ALPHA MATTING

(75) Inventor: Jue Wang, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 775 days.

(21) Appl. No.: 12/276,187

(22) Filed: Nov. 21, 2008

Related U.S. Application Data

(60) Provisional application No. 61/037,242, filed on Mar. 17, 2008.

(51) Int. Cl.
*G06K 9/34* (2006.01)

(52) U.S. Cl. ........ 382/173; 382/199; 382/224; 382/282; 348/586

(58) Field of Classification Search ................. 382/173, 382/199, 224, 282, 283; 348/586, 592
See application file for complete search history.

(56) References Cited

U.S. PATENT DOCUMENTS

| 5,355,174 | A | 10/1994 | Mishima | |
|---|---|---|---|---|
| 2006/0039611 | A1* | 2/2006 | Rother et al. | 382/199 |
| 2006/0221248 | A1* | 10/2006 | McGuire et al. | 348/587 |
| 2007/0013813 | A1* | 1/2007 | Sun et al. | 348/587 |
| 2007/0165966 | A1* | 7/2007 | Weiss et al. | 382/284 |
| 2007/0263119 | A1* | 11/2007 | Shum et al. | 348/371 |
| 2008/0056563 | A1* | 3/2008 | Schiller et al. | 382/159 |
| 2008/0122858 | A1* | 5/2008 | Wilensky | 345/592 |

OTHER PUBLICATIONS

Lin et al. "Alpha Estimation in Perceptual Color Space." Proceedings of the IEEE International Conference on Acoustics, Speech and Signal Processing, vol. 2, Mar. 18, 2005, pp. 721-724.*

X. Bai and G. Sapiro. A geodesic framework for fast interactive image and video segmentation and matting. In Proc. of IEEE Conference on Computer Vision, 2007.
Y. Boykov and M. Jolly. Interactive graph cuts for optimal boundary and region segmentation of objects in n-d images. In Proc. of IEEE Computer Vision and Pattern Recognition, 2001.
Y.-Y. Chuang, B. Curless, D. H. Salesin, and R. Szeliski. A bayesian approach to digital matting. In Proceedings of IEEE Computer Vision and Pattern Recognition, pp. 264-271, 2001.
O. Duchenne and J.-Y. Audibert. Segmentation by transduction. In Proc. of IEEE Computer Vision and Pattern Recognition, 2008.

(Continued)

*Primary Examiner* — Jon Chang
(74) *Attorney, Agent, or Firm* — Robert C. Kowert; Meyertons, Hood, Kivlin, Kowert & Goetzel, P.C.

(57) ABSTRACT

Method and apparatus for creating foreground masks, or mattes, in images including complex images. A discriminative matting technique may generate accurate alpha mattes for textured images or objects with spatial-varying color distributions. Given an input image and a trimap defining an unknown region, a discriminative color analysis is applied to the unknown region, yielding estimated alpha values, estimated binary segmentation values, and a mixture probability map for the region. The map may be adaptively smoothed. The pixels in the unknown region are classified into boundary pixels and non-boundary pixels according to the probability map. The non-boundary pixels are classified as either foreground or background pixels using a differencing technique that compares multiple pixel features. The estimated alpha values for the boundary pixels are refined. An alpha matte for the image is output. The process may be repeated until convergence of the alpha matte.

37 Claims, 12 Drawing Sheets

OTHER PUBLICATIONS

L. Grady, T. Schiwietz, S. Aharon, and R. Westermann. Random walks for interactive alpha-matting. In Proceedings of Visualization, Imaging, and Image Processing 2005, pp. 423-429, 2005. 2, 4.

Y. Guan, W. Chen, X. Liang, Z. Ding, and Q. Peng. Easy matting. In Proc. of Eurographics, 2006.

O. Juan and R. Keriven. Trimap segmentation for fast and user-friendly alpha matting. In Proc. of IEEE Workshop on Variational, Geometric & Level Set Methods, 2005.

A. Levin, D. Lischinski, and Y. Weiss. A closed-form solution to natural image matting. IEEE Trans. Pattern Analysis and Machine Intelligence, 30(2):228-242, 2008.

A. Levin, A. Rav-Acha, and D. Lischinski. Spectral matting. In Proc. of IEEE Computer Vision and Pattern Recognition, 2007.

C. Rhemann, C. Rother, A. Rav-Acha, and T. Sharp. High resolution matting via interactive trimap segmentation. In Proc. of IEEE Computer Vision and Pattern Recognition, 2008.

M. Ruzon and C. Tomasi. Alpha estimation in natural images. In Proceedings of IEEE Computer Vision and Pattern Recognition, pp. 18-25, 2000.

D. Singaraju and R. Vidal. Interactive image matting for multiple layers. In Proc. of IEEE Computer Vision and Pattern Recognition, 2008.

A. Smith and J. Blinn. Blue screen matting. In Proceedings of ACM SIGGRAPH, pp. 259-268, 1996. 6.

J. Sun, J. Jia, C.-K. Tang, and H.-Y. Shum. Poisson matting. In Proceedings of ACM SIGGRAPH, pp. 315-321, 2004.

J. Wang and M. Cohen. An iterative optimization approach for unified image segmentation and matting. In Proceedings of International Conference on Computer Vision 2005, pp. 936-943, 2005.

J. Wang and M. Cohen. Image and video matting: A survey. Foundations and Trends in Computer Graphics and Vision, 3(2):97-175, 2007.

J. Wang and M. Cohen. Optimized color sampling for robust matting. In Proc. of IEEE Computer Vision and Pattern Recognition, 2007.

Shum, H., Sun, J., Yamazaki, S., Li, Y., Tang, C.: Pop-up light field: An interactive image-based modeling and rendering system. In: ACM Transactions on Graphics. vol. 23. (2004) 143-162.

Rother, C., Kolmogorov, V., Blake, A.: Grabcut—interactive foreground extraction using iterated graph cut. In: Proceedings of ACM SIGGRAPH. (2004) 309-314.

Wang, J., Bhat, P., Colburn, A., Agrawala, M., Cohen, M.: Interactive video cutout. In: Proc. of ACM SIGGRAPH. (2005).

* cited by examiner

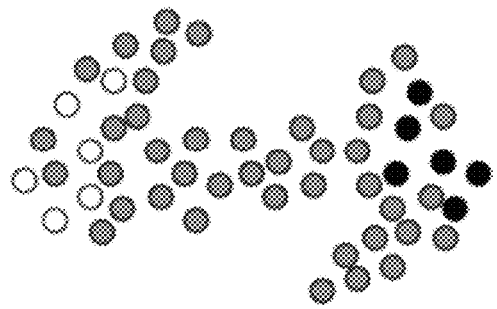
Figure 1A
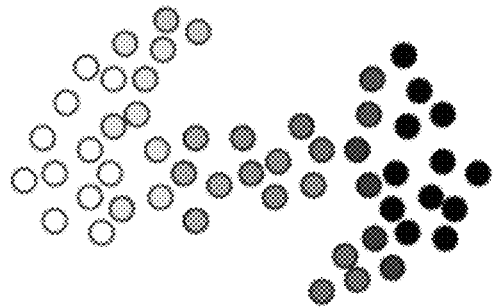
Figure 1B
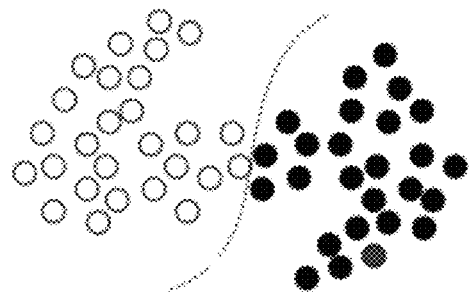
Figure 1C
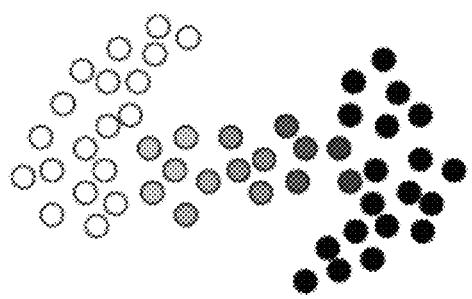
Figure 1D
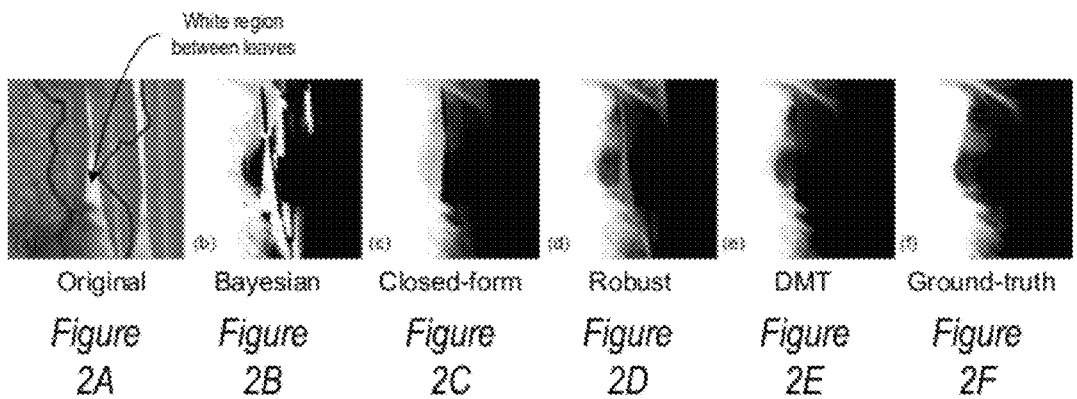
Original — Figure 2A
Bayesian — Figure 2B
Closed-form — Figure 2C
Robust — Figure 2D
DMT — Figure 2E
Ground-truth — Figure 2F

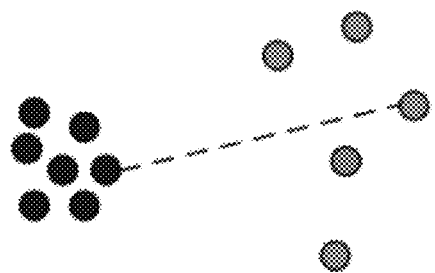
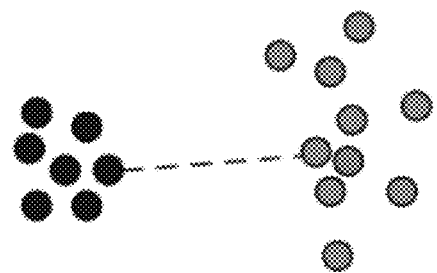
Figure 11A　　　　　　　Figure 11B
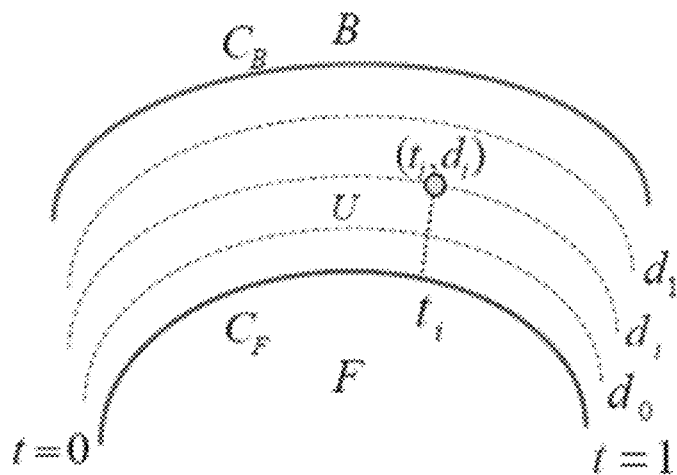
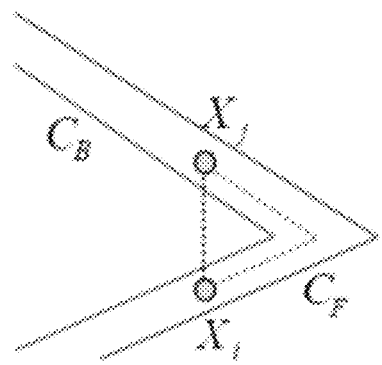
Figure 12A　　　　　　　Figure 12B

METHOD AND APPARATUS FOR DISCRIMINATIVE ALPHA MATTING

PRIORITY INFORMATION

This application claims benefit of priority of U.S. Provisional Application Ser. No. 61/037,242 entitled "Method and Apparatus for Discriminative Matting of Images" filed Mar. 17, 2008, the content of which is incorporated by reference herein in its entirety.

BACKGROUND

Description of the Related Art

With advances in digital imaging systems, using matting techniques to create novel composites or to facilitate other editing tasks has gained increasing interests, from both professionals as well as consumers. Matting refers to the problem of accurate foreground extraction from images and video. Specifically, an observed image is modeled as a convex combination of a foreground image and a background image, using an alpha matte as interpolation coefficients, and matting techniques try to recover the alpha matte with the help of additional constraints provided by the user. Once matting is successful, the alpha matte can be used as a soft mask to apply a variety of object-based editing.

Various matting approaches have been proposed to estimate accurate foreground mattes from natural images. Although these conventional approaches may work generally well for images with smooth/non-texture regions, their ability to deal with textured objects and non-homogeneous color distributions may be limited. A major reason is that most approaches assume foreground and background colors vary smoothly across the foreground boundary; thus, strong color variations presented in textured foreground and/or background regions are often mistakenly interpreted as changes in alpha values, resulting in erroneous mattes.

Conventional matting techniques may be able to generate fairly accurate mattes for images with smooth regions and homogeneous color distributions, as has been demonstrated in quantitative studies. The test images used in these studies typically contain a single or very few dominant foreground colors that remain stable towards the foreground boundary, along with significantly blurred backgrounds. As a result, the smoothness assumptions on image statistics made in these approaches typically hold, leading to reasonable results.

However, many images contain textured foreground and background regions. The performance of conventional approaches on these images degrades rapidly for at least the following reasons. First, some approaches assume foreground and background colors remain constant or vary smoothly over a local image window. This assumption will not hold over strong texture edges inside the foreground or background. Second, alpha values are often estimated in an over-aggressive way in conventional approaches. In order to fully capture the fine details of fuzzy boundaries such as hair and fur, conventional methods typically attempt to estimate fractional alpha values for as many as possible pixels, leading to an erroneous alpha matte for near-solid foreground boundaries.

Conventional matting approaches may be classified into four categories: sampling-based, affinity-based, combined, and profile-based.

Sampling-Based Approaches

Given a user-specified trimap where pixels are classified as definite foreground, definite background or unknown, for an unknown pixel, sampling-based approaches will collect a set of nearby known foreground and background colors and use them as close approximations of the true foreground and background colors of the pixel, which leaves the alpha estimation to be straightforward. However, in textured or non-homogeneous images, sampled colors sometimes will no longer represent the true foreground and background colors of unknown pixels due to color fluctuation, which often leads to erroneous alpha estimation.

Affinity-Based Approaches

Affinity-based approaches define constraints of alpha values between neighboring pixels, and solve the alpha values jointly and analytically. In this way explicit color sampling could be avoided. However, in complex images, the local color smoothness assumptions made in these approaches often fail to hold. Furthermore, small errors generated in local windows tend to be propagated into larger areas due to the affinities defined between pixels.

Combined Approaches

Combined approaches integrate sampling methods and matting affinities, typically through an optimization process.

Profile-Based Approaches

Profile-based approaches assume a strong profile for the alpha matte in order to deal with near-solid and textured boundaries. However, due to the rigidity of defined profiles, these approaches may not work well for large fuzzy regions.

SUMMARY

Various embodiments of a method and apparatus for creating accurate and soft foreground masks, or mattes, for images including complex images are described. Embodiments may provide a computer-implemented discriminative matting module that implements a discriminative matting technique which is able to generate accurate alpha matting results for textured images, or objects with spatial-varying color distributions. Embodiments may implement a discriminative color analysis process that is able to discriminate between color variations caused by texture patterns and variations caused by foreground-to-background transition. This discrimination enables embodiments to only estimate fractional alpha values for truly-mixed pixels. Embodiments of the discriminative matting module may achieve significantly better results on textured or non-homogeneous images than conventional approaches, but also achieve comparable results on images with smooth foregrounds and backgrounds. Embodiments of the discriminative matting module may provide a complete matting algorithm based on the discriminative color analysis and thus may extract more accurate alpha mattes for complex images than conventional approaches.

Embodiments of the discriminative matting technique may apply discriminant analysis into the matting process to force the matte to be conservative and to thus improve matting performance on textured images. Embodiments may employ a discriminant analysis for every pixel in an unknown region of a user-specified trimap. The discriminant analysis may first analyze whether the target pixel is a truly-mixed pixel or it is one of the foreground or background colors. If the probability of being a truly-mixed pixel is high, the discriminant analysis may generate a fractional alpha value based on linearity color analysis. Otherwise, a binary classification may be generated for the pixel. Thus, the algorithm is a truly-integrated segmentation and matting approach, where only truly-mixed pixels are picked out for alpha estimation.

In one embodiment, an image and a trimap that segments the image into a foreground, a background, and an unknown region may be input to the discriminative matting module.

The discriminative matting technique implemented by the module may generate a probability map for the pixels in the unknown region. In one embodiment, discriminative color analysis may be used to determine the probability map. In one embodiment, a smoothing technique may be applied to the generated probability map. In one embodiment, an adaptive spatial smoothing technique may be used. In one embodiment, an estimated alpha value $\hat{\alpha}_z$ and an estimated binary segmentation value $\hat{\xi}_z$ (0 or 1) may also be determined for each pixel in the unknown region.

The discriminative matting technique may classify the pixels in the unknown region into boundary pixels and non-boundary pixels according to the probability map. The discriminative matting technique may classify the non-boundary pixels into foreground pixels (alpha value 1) and background pixels (alpha value 0) according to multiple features. In one embodiment, an analysis may be performed that makes a determination for each non-boundary pixel based on the similarity of the pixel's features (e.g., color, texture and position) to its neighbor pixels as to whether the pixel should be classified as a foreground (alpha value 1) or background (alpha value 0) pixel.

The discriminative matting technique may perform optimization on the boundary pixels to refine the alpha value estimates for the boundary pixels. The boundary pixels have fractional alpha values between alpha value 0 (background) and alpha value 1 (foreground). After the alpha value estimates for the boundary pixels have been refined, the discriminative matting technique may output an alpha matte for the input image. In one embodiment, the process of probability map estimation, classification, and optimization may be iterated until convergence.

BRIEF DESCRIPTION OF THE DRAWINGS

FIGS. 1A through 1D graphically compare the classification of unknown points using conventional approaches and using embodiments of the discriminative matting technique.

FIGS. 2A through 2F show a real-world example comparing the performance of an embodiment of the discriminative matting technique to conventional approaches.

FIGS. 11A and 11B illustrate the effects of selecting too few color samples and a sufficient number of color samples, respectively, when estimating a probability map.

FIG. 12A illustrates defining a geometric position by its relative location in the unknown region parameterized using level set curves, according to one embodiment.

FIG. 12B illustrates how the parameterization illustrated in FIG. 12A allows embodiments to compare relative locations of two points in U instead of on the image lattice.

Figure 3:
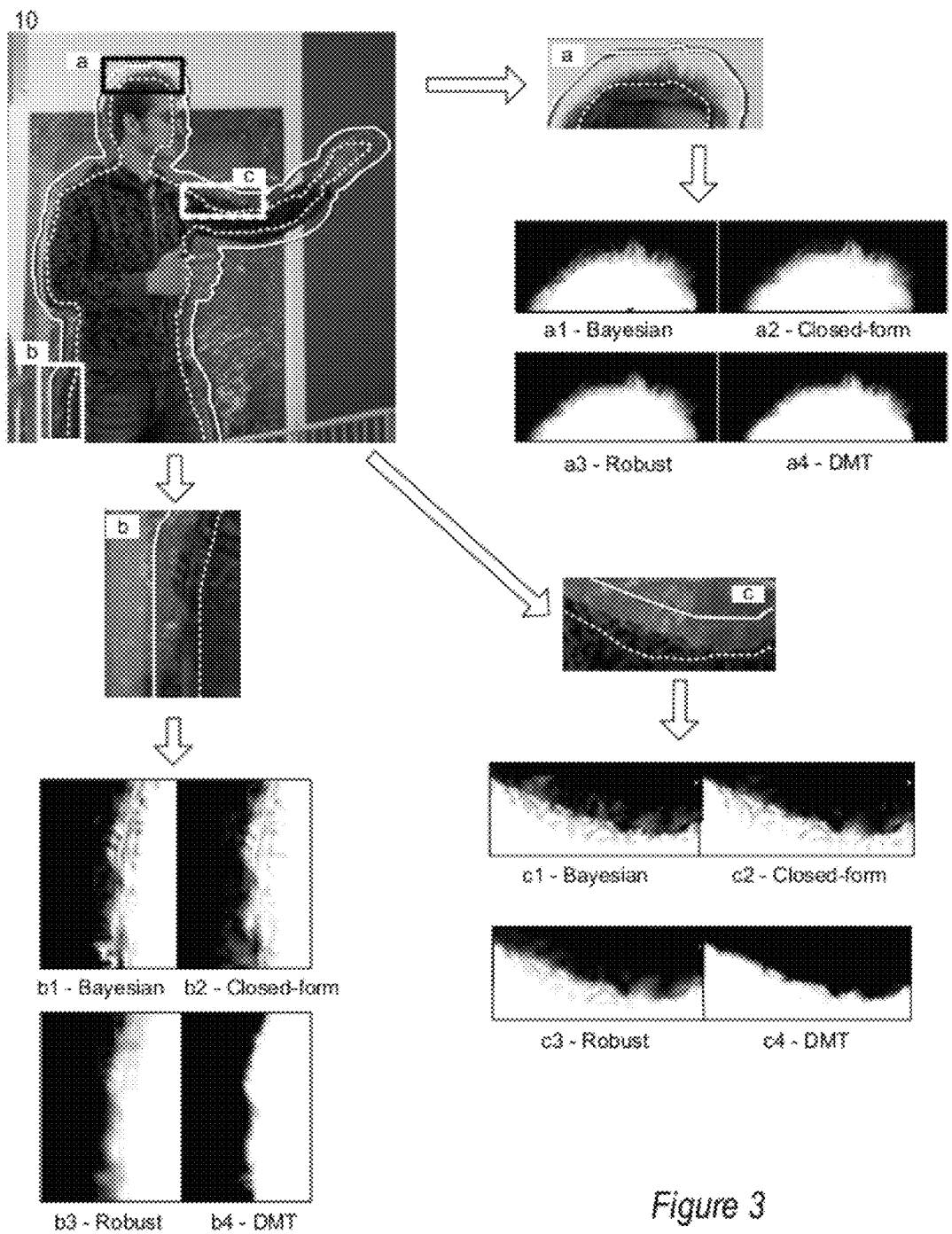
FIG. 3 illustrates an example of alpha matting over regions with different statistical characteristics and compares the performance of an embodiment of the discriminative matting technique to conventional approaches.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a method and apparatus for creating accurate and soft foreground masks, or mattes, for images including complex images are described. Embodiments may provide a computer-implemented discriminative matting module that implements a discriminative matting technique that may generate more accurate results for textured images and for images with spatial-varying color distributions when compared to conventional approaches. In the kernel of the discriminative matting technique is a discriminative color analysis technique that discriminates between color variations caused by texture patterns and variations caused by foreground-to-background transitions. This enables embodiments to more accurately estimate fractional alpha values for truly-mixed pixels than conventional approaches. Embodiments of the discriminative matting module may achieve more accurate results on textured or non-homogeneous images than conventional approaches, while also achieving at least comparable results on images with smooth foregrounds and backgrounds. Thus, embodiments provide a well-balanced system with a wide application range. Note that accuracy of the results may be measured against ground-truth for the images; embodiments may generate alpha mattes that tend to be closer to the ground-truth than alpha mattes generated by conventional approaches, and thus are more accurate.

Some embodiments of the discriminative matting module may apply discriminant analysis in the matting process to force the matte to be conservative and to thus improve matting performance over textured images. Embodiments may employ a discriminant analysis for every pixel in an unknown region of a trimap. The discriminant analysis may first analyze whether the target pixel is a truly-mixed pixel or it is one of the foreground or background colors. If the probability of being a truly-mixed pixel is high, the discriminant analysis may generate a fractional alpha value based on linearity color analysis. Otherwise, a binary classification may be generated for the pixel. Thus, the algorithm is a truly-integrated segmentation and matting approach, where only truly-mixed pixels are picked out for alpha estimation.

A trimap is a segmentation of an image or portion of an image into a known foreground region, a known background region, and an unknown region. "Unknown" refers to the fact that, initially, the classifications of the pixels within this region are not known; that is, it is unknown if a given pixel is a foreground pixel, a background pixel, or a mixed pixel. A trimap may be part of the input to the discriminative matting technique, in addition to the actual image. A trimap may be user-generated, for example via manually marking the image or through the use of a selection tool. Alternatively, a trimap may be programmatically generated, for example by an image segmentation or object location algorithm. The input trimap may be viewed as a rough outline of the unknown region between the desired foreground and the desired background. One embodiment may dilate this outline to create a band around the foreground object (or between the known foreground and known background). The discriminative matting technique operates on the unknown pixels inside this band to determine a classification for each, that is, to determine if a given pixel is a foreground pixel, a background pixel, or a mixed pixel. Thus, alpha values may be determined for pixels in the unknown region between the inner and outer boundaries of the trimap.

Embodiments of the discriminative matting technique may be classified in the combined approaches category, as the discriminative matting technique involves a combined optimization of color sampling results and matting affinities. However, embodiments of the discriminative matting technique provide advantages over conventional approaches including conventional combined approaches. For example, in contrast to profile-based approaches, embodiments of the discriminative matting technique are able to work well for both near-solid boundaries and large fuzzy structures without additional ad-hoc constraints.

Embodiments of the discriminative matting technique may combine the matting task with a statistical transductive inference. Unlike previous approaches, embodiments may assume the user-marked pixels do not fully capture the statistical distributions of foreground and background colors in the unknown region of a given trimap, and thus embodiments may allow new foreground and background colors to be recognized in the transductive labeling process, which may be performed according to a "linear-mixture" density estimation. Embodiments of the discriminative matting technique may thus:

Identify new F (foreground) and B (background) colors presented in an unknown region U.
Correctly label new F and B colors.
Accurately estimate alpha values ($\alpha$'s) for real mixed pixels in U.

Conventional alpha matting approaches generally ignore the first two and focus on the third. Embodiments of the discriminative matting technique may employ transductive inference to provide these features. To improve matting performance over complex images with minimal user input, embodiments may treat the matting task as a transductive statistical inference, under the assumption that in the unknown region of the given trimap, new foreground and background regions may exist. These new regions are close, but not equal to user marked foreground and background regions in some feature spaces. With transductive inference, embodiments may identify these regions and mark them correctly as either definite foreground or background, and only estimate fractional alpha values for real mixed pixels, which has not been done with conventional approaches including inductive inference approaches.

In machine learning tasks, transductive inference may be employed in cases where both labeled (training) and unlabeled (test) data is presented. Since all the data is presented at once, a transductive inference algorithm may take this advantage and produce a mapping function in such a way that the statistics of unlabeled data is also respected. In inductive inference, the test data is unknown beforehand; thus, the mapping function is designed solely on the training data to map any possible input data to the output space. Obviously, inductive inference has a higher requirement on the "quality" of the training data, or in other words, how well the limited training data can represent the statistical distributions of the test data. In areas of the feature space where test data may exist but no training data has been collected, inductive inference tends to make mistakes, as visualized in FIG. 2.

In the matting task, embodiments may assume a relatively loose trimap has been provided where the majority of pixels have been marked as either F (foreground) or B (background) as training data, and the rest of the pixels are marked as U (unknown) as test data. Since U is known, matting may be treated naturally as a transductive inference, which has a number of advantages over inductive inference when the color distributions in U are complicated and not fully captured by F and B. An analytic example is shown in FIGS. 1A through 1D, where white circles represent foreground (F) points, black circles represent background (B) points, and gray circles represent unknown (U) points. Suppose F, B and U are distributed in the feature space as shown in FIG. 1A; note that mixed points (points between the two clusters) as well as new Fs and Bs are unmarked (gray). Previous matting approaches tend to generate fractional alpha values ($\alpha$) aggressively, and thus will make mistakes for new Fs and Bs, as illustrated in FIG. 1B. Transductive segmentation can deal with new Fs and Bs correctly, but is not able to generate correct $\alpha$'s for mixed points, instead generating a binary classification, as illustrated in FIG. 1C. Embodiments of a discriminative matting technique as described herein may deal with unlabeled data correctly, with Fs and Bs classified correctly and a smooth transition in alpha values on the foreground/background boundary, as shown in FIG. 1D. A real-world example is shown in FIGS. 2A through 2F, which were generated using a ground-truth foreground object. In the local region shown in FIG. 2A, the background is highly textured and the white region between green leafs in U is not marked as B (in the local sense). Consequently, conventional approaches have difficulties dealing with the white region and its edges, as shown in FIGS. 2B through 2D. Embodiments of the discriminative matting technique (DMT) are able to correctly identify the white pixels as new background colors, and generate a matte (FIG. 2E) that is much closer to the ground-truth (FIG. 2F).

FIG. 3 illustrates an example of alpha matting over regions with different statistical characteristics. FIG. 3 shows an example image 10 that contains several representative difficulties that a matting algorithm may meet in real cases. The solid white line represents the outer boundary of the trimap, and the dashed white line represents the inner boundary of the trimap. Pixels outside the solid white line are known background pixels; pixels inside the dashed white line are known foreground pixels. Pixels between the two white lines are in the unknown region. By convention, when displaying and discussing alpha mattes, known foreground pixels are displayed and referred to as "white", and correspond to the alpha value 1, while known background pixels are displayed and referred to as "black", and correspond to the alpha value 0. Mixed pixels (or boundary pixels) have a fractional alpha value between 0 and 1. However, as noted, this is by convention, and is not intended to be limiting.

The hair region of the person in 10 (region a) presents a classic matting situation where the foreground edge is fuzzy, and both foreground and background regions are smooth. Conventional matting approaches generally achieve good results in such a region, as does an embodiment of the discriminative matting technique (DMT) described herein, as shown in FIG. 3. Compared matting techniques include Bayesian matting (a1), closed-form matting (a2), robust matting (a3), and an embodiment of the discriminative matting technique (DMT) described herein (a4).

The highlighted region on the person's jeans in 10 (region b) illustrates a situation where the foreground colors gradually change towards the background, and the background itself contains textures and dramatic color changes. The conventional approaches generate erroneous alpha mattes b1, b2 and b3, as shown in FIG. 3. In contrast, an embodiment of the discriminative matting technique as described herein is able to generate a more accurate alpha matte b4 than the conventional approaches.

In the highlighted arm region in 10 (region c), the foreground presents strong texture patterns. As illustrated in alpha mattes c1, c2 and c3, the conventional approaches produce noticeable errors by assigning fractional alpha values to pixels inside both the foreground and the background. An embodiment of the discriminative matting technique as described herein generates a cleaner, more accurate matte c4.

Figures 4A, 4B:
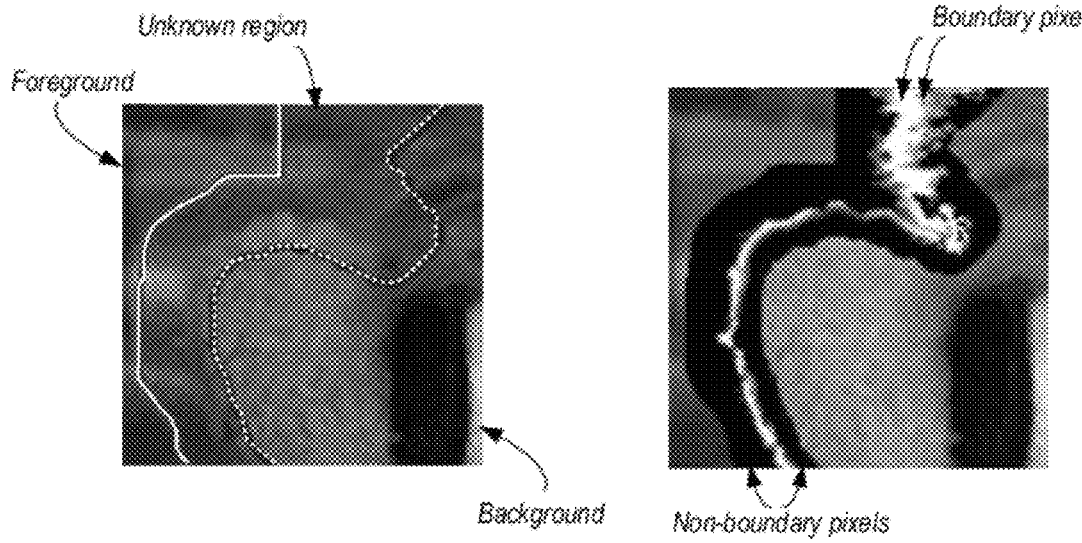
FIGS. 4A and 4B graphically illustrate operations of the discriminative matting technique according to one embodiment.

FIGS. 4A and 4B graphically illustrate operations of the discriminative matting technique according to one embodiment. In FIG. 4A, a trimap has been provided that segments the image into a background, a foreground, and an unknown region. The solid white line represents the outer boundary of the trimap, and the dashed white line represents the inner boundary of the trimap. Pixels outside the solid white line are known background pixels; pixels inside the dashed white line are known foreground pixels. Pixels between the two white lines are in the unknown region.

In FIG. 4B, the discriminative matting technique, for example implemented as a discriminative matting module, has performed initial analysis of the unknown region to classify the pixels within the region into two groups: non-boundary pixels (represented by black) and boundary pixels (represented by white). Note that the use of black and white in this image is distinct from the use of black and white in alpha mattes as described above in reference to FIG. 3 and elsewhere in the Figures, where black is used to indicate background pixels and white is used to indicate foreground pixels. A probability analysis may be applied to generate a probability map that may be used to classify the pixels into the two groups. In FIG. 4B, the white pixels in the unknown region represent foreground-to-background transitions; that is, pixels which have a high probability (a probability above a specified or calculated threshold) of being on the actual foreground/background boundary. The black pixels have a low probability (a probability below the specified or calculated threshold) of being on the actual foreground/background boundary.

In one embodiment, a smoothing technique may be applied to the probability map. In one embodiment, an adaptive spatial smoothing technique may be used.

In FIG. 4B, the non-boundary pixels may not have been classified into background and foreground pixels; further analysis may be applied by the discriminative matting module to make that classification. In one embodiment, this analysis may include, for each non-boundary pixel (the black pixels in FIG. 4B), comparing the pixel to neighbor pixels using a differencing technique that takes into account multiple features (e.g., the pixel's color, texture, and position). This analysis thus makes a determination for each non-boundary pixel based on the similarity of the pixel's features (e.g., color, texture and position) to its neighbor pixels as to whether the pixel should be classified as a foreground (e.g., alpha value 1) or background (e.g., alpha value 0) pixel. This analysis is further described below.

The discriminative matting module may apply an optimization technique to the boundary pixels (the white pixels in FIG. 4B) to further refine the alpha value estimates for those pixels. The boundary pixels have fractional alpha values between alpha value 0 (background) and alpha value 1 (foreground). After the alpha value estimates for the boundary pixels have been refined, an alpha matte may be output, as illustrated in and described for FIGS. 5 through 7.

Figure 5:
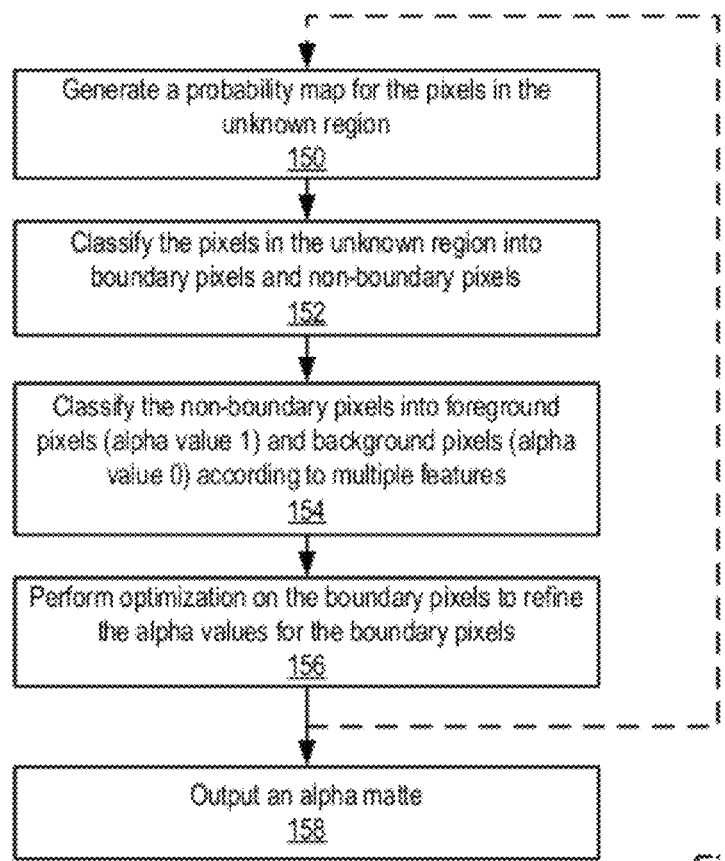
FIG. 5 is a flowchart of the discriminative matting technique according to one embodiment.

FIG. 5 is a flowchart of the discriminative matting technique according to one embodiment. The discriminative matting technique may be implemented as or in a discriminative matting module. An image and a trimap that segments the image into a foreground, a background, and an unknown region may be input to the discriminative matting module (see, e.g., FIG. 4A). The trimap may be user-generated, e.g. by using a user interface tool or method to trace lines on the image, or alternatively may be generated by an automated image processing technique such as an image segmentation technique or an object location technique. As indicated at 150, the discriminative matting technique may generate a probability map for the pixels in the unknown region. In one embodiment, discriminative color analysis may be used to determine the probability map.

Figure 6:
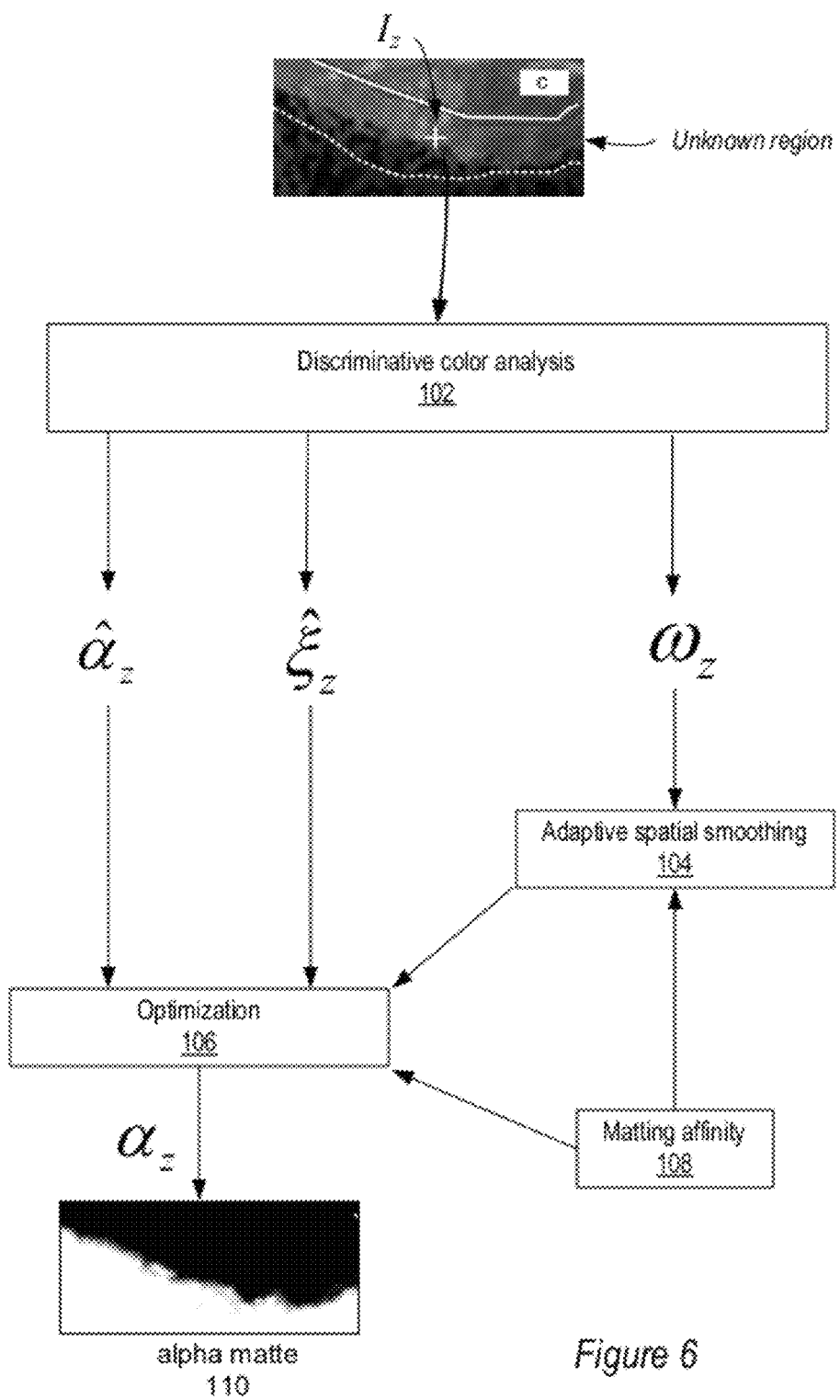
FIG. 6 illustrates the framework of and dataflow in the discriminative matting technique according to one embodiment.

In one embodiment, a smoothing technique may be applied to the generated probability map. In one embodiment, an adaptive spatial smoothing technique may be used. In one embodiment, an estimated alpha value $\hat{\alpha}_z$ and an estimated binary segmentation value $\hat{\xi}_z$ (0 or 1) may also be determined for each pixel in the unknown region, as shown in FIG. 6.

As indicated at 152, the discriminative matting technique may classify the pixels in the unknown region into boundary pixels (e.g., the white pixels in FIG. 4B) and non-boundary pixels (e.g., the black pixels in FIG. 4B) according to the probability map. In one embodiment, to perform this classification, the calculated probability for each pixel may be compared to a specified or calculated threshold. Other techniques may be used to perform this classification.

As indicated at 154, the discriminative matting technique may classify the non-boundary pixels (e.g., the black pixels in FIG. 4B) into foreground pixels (alpha value 1) and background pixels (alpha value 0) according to multiple features. In one embodiment, an analysis may be performed that makes a determination for each non-boundary pixel based on the similarity of the pixel's features (e.g., color, texture and position) to its neighbor pixels as to whether the pixel should be classified as a foreground (alpha value 1) or background (alpha value 0) pixel.

As indicated at 156, the discriminative matting technique may perform optimization on the boundary pixels (e.g., the white pixels in FIG. 4B) to refine the alpha value estimates for the boundary pixels. The boundary pixels have fractional alpha values between alpha value 0 (background) and alpha value 1 (foreground). After the alpha value estimates for the boundary pixels have been refined, the discriminative matting technique may output an alpha matte for the input image, as indicated at 156.

The probability map estimation (element 150 of FIG. 5) may depend on the available F (foreground) and B (background) training data. After the optimization is solved according to a linear system (e.g., elements 152-156 of FIG. 5), some pixels in the unknown region may be classified as F (foreground) and B (background), giving new F and B samples which may be used to refine the probability map ($\omega_z$) estimation. Thus, in one embodiment, the process of probability map estimation and optimization may be iterated until convergence. In other words, in one embodiment, elements 150-156 of FIG. 5 may be repeated until convergence is achieved, as illustrated by the dashed line in FIG. 5. The convergence may be guaranteed since the upper limit of the number of possible new F and B samples is all the pixels in the unknown region U; in practice, the alpha matte typically becomes stable after two or three iterations.

FIG. 6 illustrates a framework for and dataflow in the discriminative matting technique according to one embodiment. Corresponding to element 150 of FIG. 5, given an input image and a trimap, a discriminative color analysis 102 may be applied to every unknown pixel I, individually, yielding three values: an estimated alpha value $\hat{\alpha}_z$; an estimated binary segmentation value $\hat{\xi}_z$ (0 or 1); and a probability that the pixel is a truly-mixed one, denoted as $\omega_z$. The mixture probability $\omega_z$ may play a key role in embodiments of the discriminative matting technique as described herein in order to achieve good results on complex images. The mixture probability $\omega_z$ for all pixels in the unknown region may be referred to as a probability map.

In one embodiment, the individually estimated mixture probabilities (the $\omega_z$'s for all unknown pixels) may then be adaptively smoothed 104 to eliminate noise and produce a smoother mixture probability map with respect to local image statistics. In one embodiment matting affinity 108 may be applied in the smoothing process. Finally, the three values $\hat{\alpha}_z$, $\hat{\xi}_z$, and $\omega_z$, may be combined in an optimization process 106, in one embodiment along with matting affinity 108, to produce the final matte $\alpha_z$ (alpha matte 110). In one embodiment, the optimization process corresponds to elements 152 through 156 of FIG. 5. As noted above in reference to FIG. 5, in one embodiment, 102 through 108 may be applied iteratively until convergence.

Figure 7:
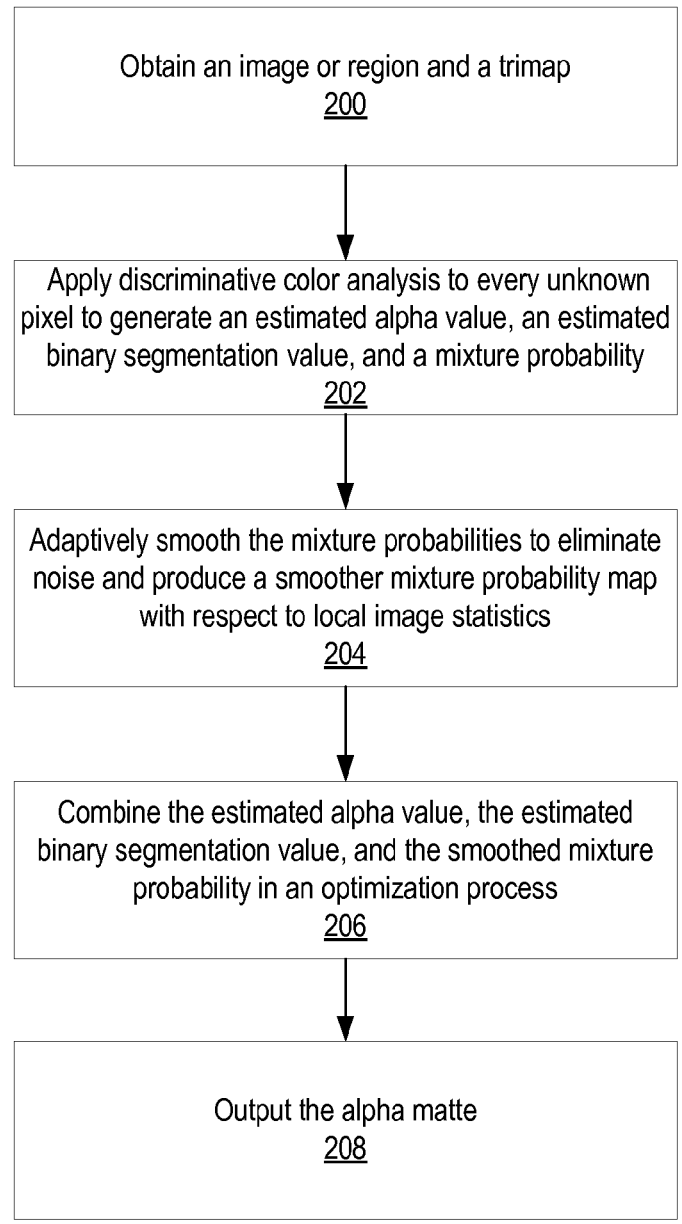
FIG. 7 illustrates a flowchart of the discriminative matting technique as illustrated in FIG. 6 according to one embodiment.

FIG. 7 illustrates a flowchart of the discriminative matting technique as illustrated in FIG. 6 according to one embodiment. As indicated at 200, an image or region for which a matte is to be generated, and a trimap, are obtained. As indicated at 202, discriminative color analysis is applied to every unknown pixel to generate an estimated alpha value ($\hat{\alpha}_z$), an estimated binary segmentation value ($\hat{\xi}_z$), and a mixture probability ($\omega_z$) (see element 150 of FIG. 5). As indicated at 204, the mixture probabilities may be adaptively smoothed to eliminate noise and produce a smoother mixture probability map with respect to local image statistics. As indicated at 206, the estimated alpha value, estimated binary segmentation value, and the smoothed mixture probability are combined in an optimization process (see elements 152 through 156 of FIG. 5), in one embodiment along with application of matting affinity. As indicated at 208, an alpha matte is output. As noted above in reference to FIG. 5, in one embodiment, 202 through 206 may be applied iteratively until convergence.

The following describes embodiments of the discriminative matting technique and sub-processes or elements thereof as discussed in relation to the above FIGS. 1 through 7 in more detail, and provides an analysis and various equations that may be used in embodiments.

Discriminative Color Analysis

Linearity Analysis

Figure 8A:
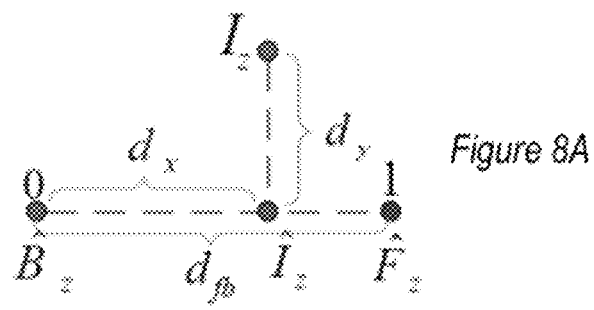
FIGS. 8A through 8D graphically illustrate a linearity analysis technique according to one embodiment.

In one embodiment, given an input image and a user-specified trimap, a group of foreground and background colors is collected to help estimate the alpha value of any given unknown pixel. Specifically, as shown in FIG. 8A, given an unknown pixel $I_z$ and a pair of foreground and background colors $\hat{F}_z$ and $\hat{B}_z$, the alpha value can be estimated by projecting $I_z$ onto the line defined by $\hat{F}_z$ and $\hat{B}_z$, and computing the relative position of the projected color $I'_z$. This may be straightforward, given the linear compositing model assumed in the matting problem.

Given a set of foreground and background samples, some conventional approaches treat every sample pair equally to estimate the alpha value, which has been proven to be not reliable. The reason is that a sample pair along with the target pixel may not fit the linear compositing model very well, indicating that this particular sample pair is not suitable for estimating the alpha value of the target pixel. Respecting to this property, a confidence value may be designed based on the distance ratio between the projection distance ($|I_z-I'_z|$) and the foreground-to-background distance ($|\hat{F}_z-\hat{B}_z|$). Only sample pairs with lowest distance ratios are used for alpha estimation. However, this approach does not answer the following questions:

What is the statistically correct way to compute the confidence value?

What should be done if confidence values computed from all sample pairs are low?

For textured or complex images, these questions may be crucial, especially the second question, since collected samples may fail to describe the target pixel due to large color variations.

Embodiments of the discriminative matting technique may implement the following approaches:

Rather than estimating $\alpha_z$ directly, embodiments may first estimate the probability that each pixel in the unknown region is a truly-mixed pixel, denoted as $\omega_z$ in FIG. 6. This generates a probability map that may allow the technique to distinguish truly-mixed (boundary) pixels from other (non-boundary) pixels that reside in the unknown region but are actually foreground or background pixels.

For pixels with low mixture probabilities, embodiments explicitly classify the pixels into either the foreground or background, since they are very unlikely to be mixtures between the foreground and background.

Estimating $\hat{\alpha}_z$ and $\omega_z$

Figure 8B:
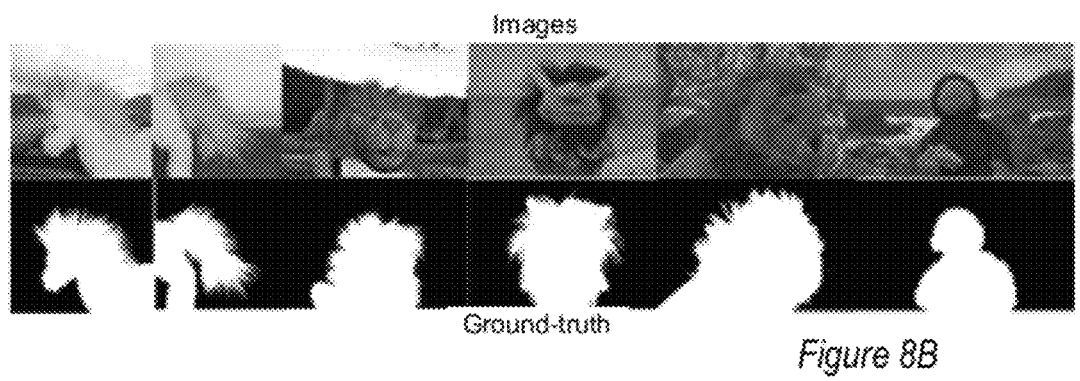
Figure 8C:
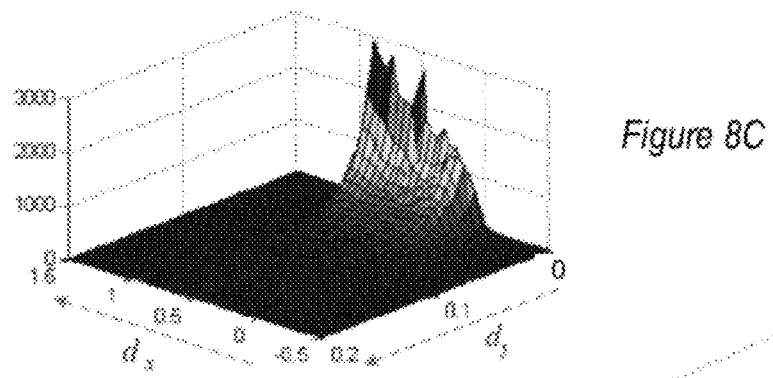

FIGS. 8A through 8D graphically illustrate a linearity analysis technique according to one embodiment. The approach of estimating the mixture probability $\omega_z$ implemented in embodiments of the discriminative matting technique may be illustrated by examining available ground-truth data sets. As shown in FIG. 8B, several images may be collected along with ground-truth foreground mattes. On each test image, for each pixel whose alpha value is fractional ($0<\alpha_z<1$), several (e.g., 20) nearby foreground and background colors $\alpha_z$=1 or 0 are sampled, and the best sample pair is chosen which best explains the pixel's color as a linear combination, i.e., the sample pair ($\hat{F}_z,\hat{B}_z$) which produces the minimal distance ratio $d_y/d_{fb}$ as illustrated in FIG. 8A. Once the sample pair is chosen, the relative position of the fractional pixel $I_z$ in FIG. 8C is calculated, by normalizing the distance $|\hat{F}_z-\hat{B}_z|$ to 1 and aligning $\hat{B}_z$ to (0, 0) and $\hat{F}_z$ to (1, 0). FIG. 8C thus shows the histogram of normalized relative positions of fractional pixels extracted from all six test images, and illustrate a visible "waterfall" shape to the histogram.

An important conclusion drawn from the above discussion is that most fractional pixels fall into the region whose Y-axis value is smaller than 0.1. This is consistent with the fundamental assumption that pixels with fractional alpha values are linear combinations of foreground and background colors. Furthermore, the density of pixels falls rapidly outside this region, indicating that unknown pixels that exhibit large fitting errors with known foreground and background colors are typically not truly-mixed pixels.

Classifying the Non-Boundary Pixels

Figure 8D:
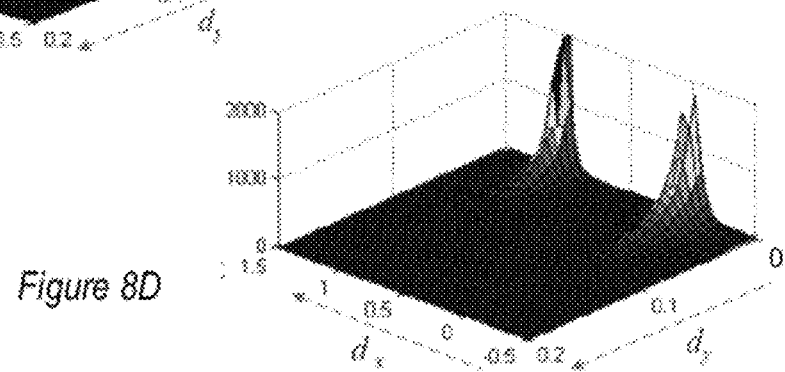

In real-world cases, for example as shown in the unknown region of FIG. 3 including exemplary regions a, b and c, the unknown region covers not only truly-mixed pixels, but also a large number of foreground and background pixels, i.e. non-boundary pixels. In one embodiment, to analyze the statistical distributions of these non-boundary pixels, a trimap may be created for each test image by dilating the region of truly-mixed pixels, and applying the same or a similar linearity analysis as that described above to pixels inside the unknown region but having alpha values of either 0 or 1 (i.e., non-boundary pixels). FIG. 8D shows the statistical histogram of these pixels, which presents a clear "boots" shape.

A significant difference between the histograms in FIGS. 8C and 8D suggests that linearity analysis is able to statistically discriminate truly-mixed pixels from definite foreground and background pixels. A method to achieve this is to develop likelihood functions that fit the statistical histograms computed from the training data. Mathematically, given a target pixel I, and a pair of foreground and background colors $\hat{F}_z$ and $\hat{B}_z$, embodiments may compute a mixture likelihood $M_z(\hat{F}_z, \hat{B}_z)$, a binary likelihood $B_z(\hat{F}_z, \hat{B}_z)$, and an estimated alpha value $\hat{\alpha}_z(\hat{F}_z, \hat{B}_z)$ as:

$$\alpha_z(\hat{F}_z,\hat{B}_z)=\Gamma(d_x) \qquad (1)$$

$$M_z(\hat{F}_z, \hat{B}_z) = \begin{cases} 0, \text{ if } d_x < 0 \text{ or } d_x > 1 \\ \exp\left(-\frac{\delta(d_y-\varepsilon_y)(d_y-\varepsilon_y)}{\sigma_y} - \frac{|d_x-0.5|}{\sigma_a}\right), \text{else} \end{cases} \qquad (2)$$

$$B_z(\hat{F}_z, \hat{B}_z) = \exp\left(-\frac{\delta(d_y-\varepsilon_y)(d_y-\varepsilon_y)}{\sigma_y} - \frac{\alpha_z(\hat{F}_z,\hat{B}_z)}{\sigma_x} - \frac{1-\alpha_z(\hat{F}_z,\hat{B}_z)}{\sigma_x}\right) \qquad (3)$$

where $d_x$ and $d_y$ are computed by the linearity analysis shown in FIG. 8A, and $\Gamma(x)$ is a truncation function whose output is 1 if x>1, 0 if x<0, and x otherwise. $\delta(x)=1$ for $x \geq 0$ is a standard step function. The four parameters, $\epsilon_y$, $\sigma_y$, $\sigma_x$ and $\sigma^\alpha$, may be estimated from histograms such as those illustrated in FIGS. 8C and 8D, and in one embodiment the parameters may be set to: $\epsilon_y$=0.1, $\sigma_y$=0.025, $\sigma_x$=0.02 and $\sigma_\alpha$=0.25. Intuitively, $\epsilon_y$ and $\sigma^y$ determine the falling shapes of the histograms along the y axis, $\sigma_\alpha$ may be used to give more weight to alpha values around 0.5 which have higher probability to represent truly-mixed pixels, and $\sigma_x$ controls the falling shape of the two peaks in the histogram illustrated in FIG. 8D along the x axis.

Finally, in one embodiment, given a set of foreground samples $F_z^i$ and background samples $B_z^j$, i, j$\in$[1,N], the final mixture probability $\omega_z$ may be computed as:

$$\omega_z = \Gamma\left(\max_{i,j} M_z(\hat{F}_z^i, \hat{B}_z^j) - \max_{i,j} B_z(\hat{F}_z^i, \hat{B}_z^j) - \max_{i,j} M_z(\hat{F}_z^i, \hat{F}_z^j) - \max_{i,j} M_z(\hat{B}_z^i, \hat{B}_z^j)\right) \qquad (4)$$

Figure 9A:
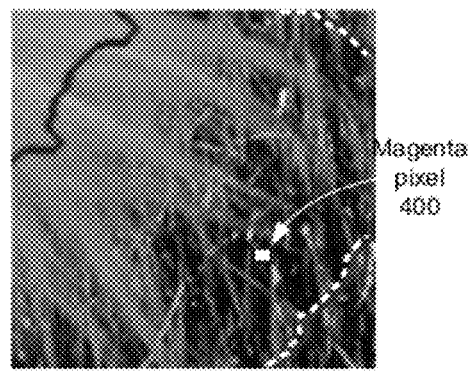
FIGS. 9A and 9B illustrate modeling an unknown pixel as a linear combination of two colors in one class according to one embodiment.
Figure 9B:
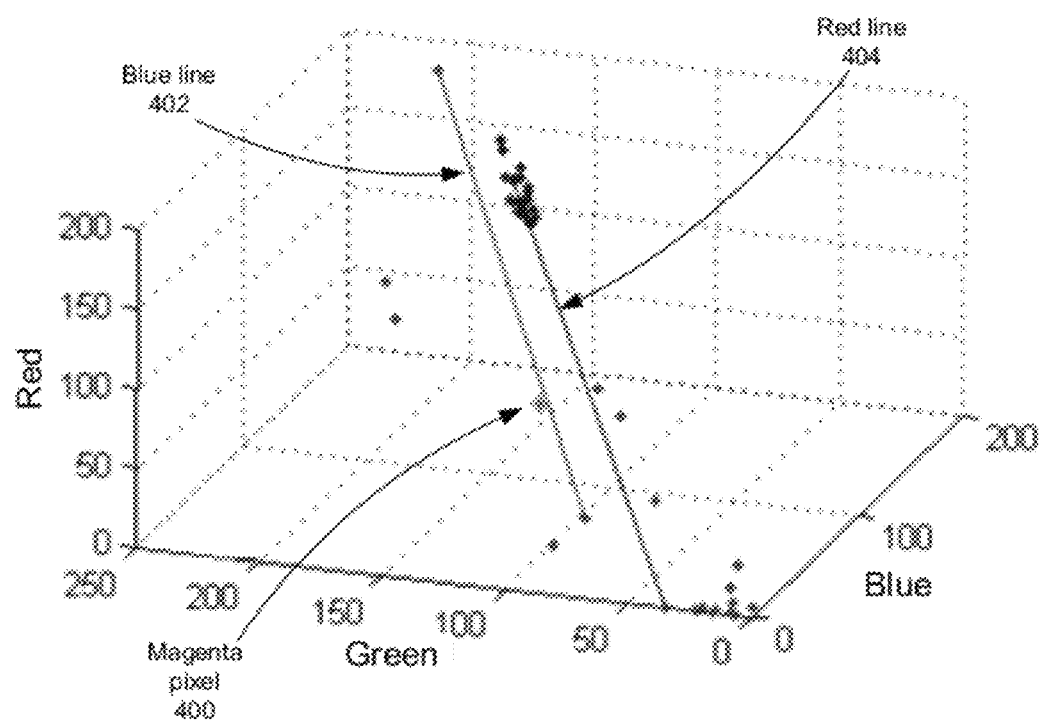

In one embodiment, the first two terms in Equation 4 may be computed by examining every possible pair of foreground and background samples, and recording the maximum mixture likelihood and binary likelihood. The last two terms may be computed by attempting to model the unknown pixel as a linear combination of any two colors of the same class. If the unknown pixel can be well modeled as a linear combination of two colors in one class, then the unknown pixel itself probably also belongs to the class; thus, the mixture probability $\omega_z$ should be small, and the pixel may be classified as a non-boundary pixel. An example is shown in FIGS. 9A and 9B. FIG. 9A illustrates sampling known foreground (red) and background (blue) colors for a magenta pixel 400. FIG. 9B illustrates the sampled colors in RGB space. By comparing within-class color fitting (blue line 402) against cross-class color fitting (red line 404), the unknown pixel may be assigned to be a background pixel. Twenty foreground and background colors are sampled for the magenta pixel 400 in 5A, and are plotted in the RGB 3D space in FIG. 9B. Given the highly-textured background region, a large color variance for background samples may be observed. If only cross-class fitting is observed, it is possible to find a pair of foreground and background samples that fit well with the target pixel (e.g., the red line 404 in the 3D plot in FIG. 9B); thus, the pixel may be mistakenly given a high mixture probability. However, in one embodiment, by examining the within-class fitting in background samples, two background colors may be found which fit the unknown pixel better, i.e.:

$$\max_{i,j} M_z(\hat{B}_z^i, \hat{B}_z^j) > \max_{i,j} M_z(\hat{F}_z^i, \hat{B}_z^j)$$

which enables embodiments to set $\omega_z = 0$ and to correctly classify the pixel to be a background pixel.

Theoretically, examining within-class fitting assumes that for a local image region, all foreground/background pixels will fall into the convex hull constructed by sampled foreground/background colors in the color space. This may not always be true, since the number of color samples are limited. However in practice it may be found that the last two terms in Equation 4 can improve the estimation accuracy for complex examples.

Once $\omega_z$ is determined, the corresponding estimated alpha value may be computed as:

$$\hat{\alpha}_z = \alpha_z(\hat{F}_z^{i*}, \hat{B}_z^{j*})$$

where:

$$M_z(\hat{F}_z^{i*}, \hat{B}_z^{j*}) = \max_{i,j} M_z(\hat{F}_z^i, \hat{B}_z^j)$$

Smoothing $\omega_z$

Applying discriminative linearity analysis individually on each pixel tends to generate a noisy probability map, as no spatial coherent constraint is applied. To generate a smoother probability map which respects to the local image statistics, embodiments apply a matting affinity as a spatial smoothness constraint for the probability map, and use the matting Laplacian coefficients defined in that approach as smoothing weights between neighboring pixels. Mathematically, the smoothing operation may be applied as:

$$\omega_z^{t+1} = (1 - \lambda_s)\omega_z^t + \lambda_s \sum_{v \in N(z)} (-L_{z,v} \cdot \omega_v^t) / L_{z,z} \quad (5)$$

where L is a matting Laplacian, which is a symmetric banded matrix. N(z) is a 3×3 window centered at z. $L_{z,v}$ and $L_{z,z}$ are coefficients in the Laplacian matrix. t stands for smoothing iteration; in one embodiment, the total iteration number may be set to 20. $\lambda_s$, is the strength parameter, which in one embodiment may be set to 0.5.

Figure 10A:
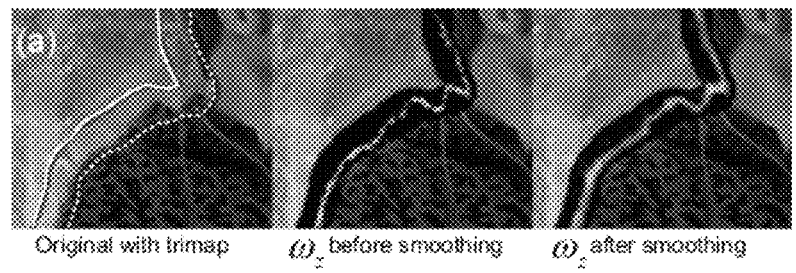
FIGS. 10A through 10C illustrate examples of estimated mixture probability maps before and after smoothing according to embodiments.
Figure 10B:
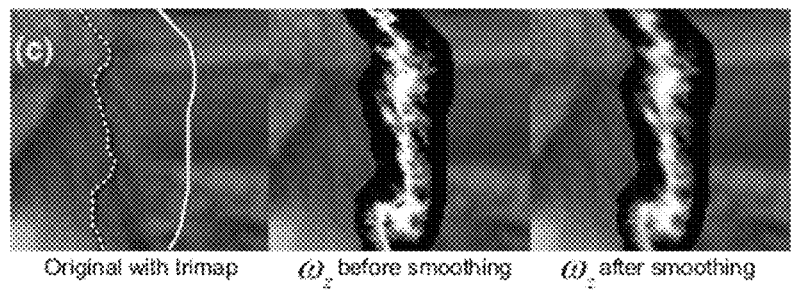
Figure 10C:
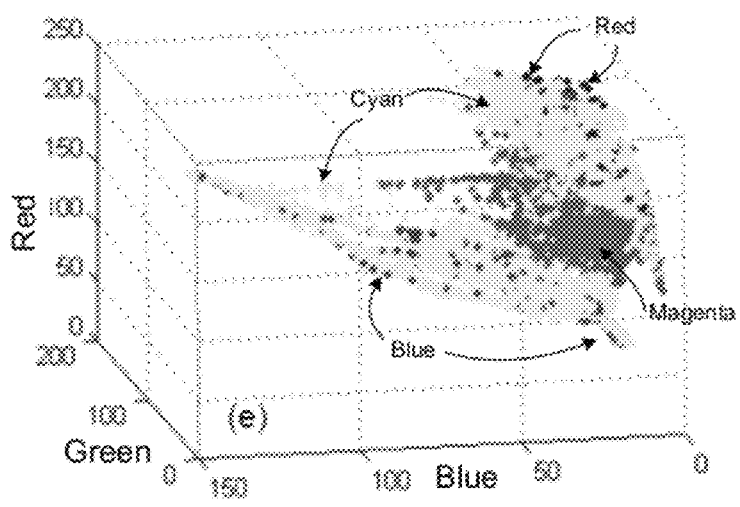

FIGS. 10A and 10B illustrate some examples of estimated mixture probability maps $\omega_z$ before and after smoothing according to embodiments. Each Figure includes three boxes that show a phase of the process. From left to right in each of the, the there boxes show: the original image with trimap boundary; $\omega_z$ before smoothing; and $\omega_z$ after smoothing. It can be seen that, after adaptive smoothing, the probability map is more spatially stable and consistent. The probability map captures the real foreground-to-background transition in FIG. 10A, and how large fuzzy regions are captured in FIG. 10B. In the graph illustrated in FIG. 10C, unknown pixels are plotted in RGB space, where red and blue dots are foreground and background boundary pixels, respectively, magenta dots are pixels whose final mixture probability is greater than 0.5 ($\omega_z > 0.5$), and cyan dots are pixels whose mixture probability is less than 0.5 ($\omega_g < 0.5$). These examples clearly suggest that the described discriminative linearity analysis is able to pick out truly-mixed pixels for alpha estimation.

Number of Color Samples

The accuracy of the estimation of the probability map ($\omega_g$) may be affected by whether a sufficient amount of color samples is collected. As shown in FIG. 11A, if too few color samples are collected, then some foreground or background pixels may be mistakenly assigned with high $\omega_g$ values, and may thus cause an unknown pixel to be misclassified as mixed. In one embodiment, this problem may be alleviated by collecting more samples to form high-density regions in the color space, as shown in FIG. 11B. By collecting more samples, an unknown pixel may be more correctly classified as background/foreground or mixed. In one embodiment, a large number of color samples (e.g., 300 for both F and B) to minimize the possible errors of $\omega_g$, although the computational efficiency may be affected.

Estimating $\hat{\xi}_z$

Embodiments may estimate a binary segmentation label $\hat{\xi}_z \in \{0,1\}$ for every pixel in the unknown region. As will be demonstrated, for pixels with smaller mixture probabilities, which indicates the pixels are more likely to be definite foreground or background pixels, the binary segmentation label $\hat{\xi}_z$ may play a significant role in determining their final alpha values.

A simple way to calculate a binary labeling is to check the estimated alpha value $\hat{\alpha}_z$, and set $\hat{\xi}_z = 1$ if $\hat{\alpha}_z > 0.5$, and $\hat{\xi}_z = 0$ if $\hat{\alpha}_z < 0.5$. However, although this simple method works well for most pixels, it tends to make mistakes occasionally when $\hat{\alpha}_z$ is not well estimated. These errors may cause discontinuities in the final matte.

In order to achieve a more consistent binary labeling, one embodiment may employ a geodesic segmentation framework. The $\hat{\alpha}_z$'s may be treated as a foreground likelihood map in the unknown region, and the geodesic distance from an unknown pixel $I_z$ to the foreground may be computed as:

$$D_f(I_z) = \min_{s \in \Omega_f} d_g(s, I_z) \quad (6)$$

where distance $d_g$ is defined as:

$$d_g(s1, s2) = \min_{C_{s1,s2}} \int_0^1 |\Delta\hat{\alpha} \cdot \dot{C}_{s1,s2}(p)| dp \quad (7)$$

where $C_{s1,s2}(p)$ is a path connecting the pixels s1, s2 (for p=0 and p=1 respectively). The geodesic distance $D_f(I_z)$ can be efficiently computed in linear complexity. To compute the binary label $\hat{\xi}_z$, one embodiment may also compute the geodesic distance from $I_z$ to the background region as $D_b(I_z)$, and set $\hat{\xi}_z = 1$ if $D_f(I_z) > D_b(I_z)$, and $\hat{\xi}_z = 0$ if $D_f(I_z) \leq D_b(I_z)$.

Optimization—Optimizing the Alpha Value Estimates for Boundary Pixels

Once the mixture probability $\omega_g$, initial alpha guess $\hat{\alpha}_z$, and binary segmentation label $\hat{\xi}_z$ are computed for pixel $I_z$, one embodiment may combine the values to generate an improved alpha estimation as:

$$\hat{\alpha}_z^* = \omega_z^2 \hat{\alpha}_z + (1+\omega_z^2)\hat{\xi}_z \quad (8)$$

This ensures that fractional alpha values are estimated only for pixels with high mixture probabilities (boundary pixels). For pixels with low mixture probabilities (non-boundary pixels), the binary segmentation label $\hat{\xi}_z$ tends to dominate the combination and bias the alpha value to be either 0 or 1. A reason that $\bar{\omega}_z^2$ is used as the interpolation coefficient instead of $\omega_z$ is to further penalize on small mixture likelihoods. To further improve the results, one embodiment again applies the matting affinity as additional spatial constraints. In one embodiment, the final matte may be computed as:

$$\alpha = \arg\min_\alpha \left( \alpha L \alpha + \lambda_\alpha \sum_z e^{(-\bar{\omega}_z/\sigma_z)}(\alpha - \hat{\alpha}_z^*)^2 \right) \quad (9)$$

where L is again the matting Laplacian, $\lambda_\alpha$ is a balance weight, which in one embodiment may be set to 0.1, and $\sigma_z$ is a variance value, which in one embodiment may be set to 0.5. The term $e^{(-\bar{\omega}_z/\sigma_z)}$ may be introduced to give higher weights for pixels with low mixture probabilities to encourage the final $\alpha_z$ to be close to $\hat{\alpha}_z^*$, which is already biased towards 0 or 1. The weight is lower for truly-mixed pixels so that the final alpha value will be estimated with respect to both the matting Laplacian and the alpha prior $\hat{\alpha}^*$.

Kernel Functions

In one embodiment, for a pixel i in the unknown region, the feature vector $X_i$ contains three components: the RGB color vector $I_i$, the color level of a local 3×3 patch $I_i^P$ as the texture feature, and a geometric position $G_i$ which is not defined by the absolute x-y coordinates of the pixel, but by its relative location in the unknown region parameterized using level set curves, as shown in FIG. 12A. One embodiment may first parameterize the boundary curve of the F region as $C_F(t)$, and then apply a distance transform in U to parameterize the region using level set curves. For a given pixel i, $G_i$ is parameterized as $(t_i, d_i)$. This parameterization allows embodiments to compare relative locations of two points in U instead of on the image lattice; thus, shape corners of the foreground boundary can be respected. An illustration is shown in FIG. 12B, where two pixels $X_i$ and $X_j$ are on the two sides of a sharp corner. If absolute x-y coordinates were used, the two pixels would have a short distance and thus may have a stronger affinity, which will encourage $\alpha_i$ and $\alpha_j$ to have a smaller difference; thus, statistical changes along $C_F$ may not be respected. Using parameterization, however, these two points may have a weaker affinity.

A goal of the Laplacian $L^b$ is to classify new Fs and Bs in a binary sense. One embodiment may use a weighted Gaussian kernel, for example as shown in equation (10):

$$\tilde{k}^b(X_i, X_j, a_i, a_j) = \alpha_i \alpha_j \exp(-(\|I_i - I_j\|^2/2h_c^2 + \|I_i^P - I_j^P\|^2/2h_p^2 + \|G_i - G_j\|^2/2h_g^2))$$

To reduce the complexity, one embodiment may use a truncated version of the Gaussian kernel for the geometric distance, for example by setting $h_g = 1.25$ and applying a threshold at 0.05. In this way, $L^b$ becomes a sparse matrix. $h_c$ and $h_p$ are color and texture variances which can be either fixed as user-specified constants or computed dynamically using local image statistics. Computing the variances dynamically may work better when the input image contains both smooth regions and textured regions.

It is possible to further normalize the kernel. However, embodiments may not use this normalization since each $X_i$ is associated with a weight, and normalizing the kernel may undesirably cancel out the effects of the weights.

Denoting $W^b$ as the n×n matrix where $W_{ij}^b = \tilde{k}^b(X_i, X_j)$, and denoting $D^d$ as the diagonal n×n matrix where $D_{ii}^b = \Sigma_{j=0}^n \tilde{k}^b(X_i, X_j)$, then $L^b$ may be defined as $L^b = D^b - W^b$.

A goal of $L^m$ in the optimization problem is to accurately estimate alpha values for real mixed pixels in U. Although the same weighted Gaussian kernel can be defined for $L^m$, a matting Laplacian has been shown to be able to generate the most accurate mattes among affinity-based matting approaches. Some embodiments may use this affinity and define $\tilde{k}^m(X_i, X_j, a_i, a_j) = a_i a_j \mu(i,j)$, where $\mu(i,j)$ is the matting Laplacian coefficient defined in Equation 5. Similarly, some embodiments may define $W^m$ as the n×n matrix where $W_{ij}^m = \tilde{k}^m(X_i, X_j) = \tilde{k}^m(X_i, X_j, \omega_i, \omega_j)$, $D^m$ as the diagonal n×n matrix where $D_{ii}^m = \Sigma_{j=0}^n \tilde{k}^m \tilde{k}^m(X^i, X^j)$, and $L^m$ as $L^m = D^m - W^m$.

Results and Comparisons

Figure 13:
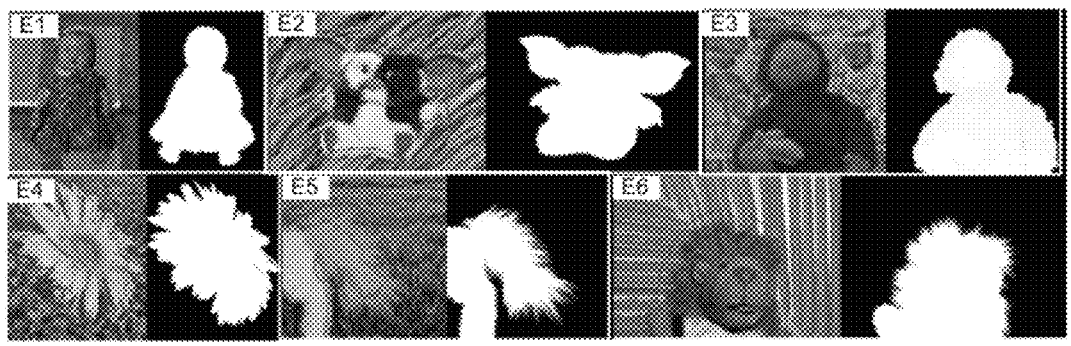
FIG. 13 illustrates six test images containing textured backgrounds, with trimap boundaries overlaid and ground-truth mattes.
Figure 14:
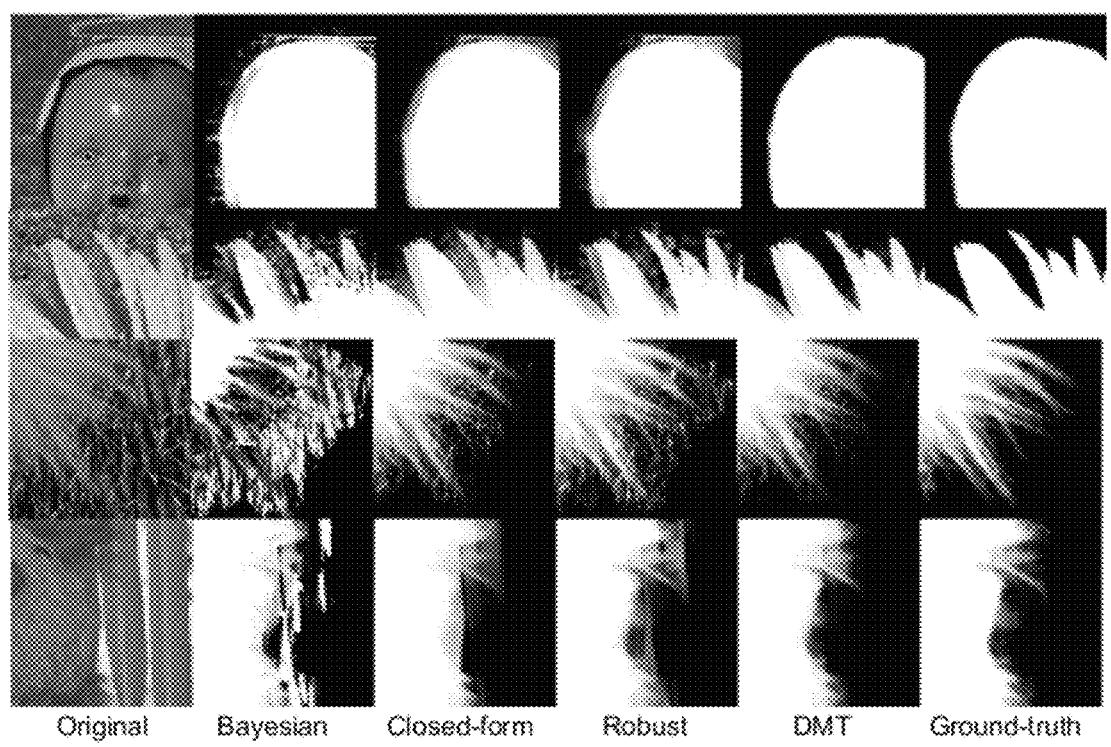
FIG. 14 illustrates and compares partial alpha mattes generated by different techniques including an embodiment of the discriminative matting technique.

To quantitatively and objectively evaluate the discriminative matting technique described herein, a test data set may be used that contains highly-textured backgrounds, as shown in FIG. 13, which includes six test images containing textured backgrounds, with trimap boundaries overlaid and associated ground-truth mattes. The data set contains both "hairy" foreground objects and near-solid ones. For each example, a relatively loose trimap is specified as the user input. Four algorithms are applied on the test data set, including Bayesian matting, closed-form matting, robust matting, and an embodiment of the discriminative matting technique as described herein. Specifically, Bayesian matting is chosen as the representative sampling-based approach, closed-form matting is chosen as an affinity-based method, and robust matting is chosen as an optimization-based method. FIG. 14 shows partial mattes generated by the different algorithms, and suggests that although none of the systems can produce mattes identical to the ground-truth due to the complexity of the test images, the discriminative matting technique (DMT) significantly and consistently outperforms the conventional approaches.

Results of similar tests using test sets that include images with smooth foreground and background regions suggest that the discriminative matting technique also achieves accurate mattes when compared with results of conventional algorithms in cases where the images do not necessarily contain complex textures.

Conventional matting systems are biased towards smooth foreground and background regions, and thus tend to produce erroneous mattes when dealing with textured objects. Embodiments of the discriminative matting technique may produce significantly higher quality mattes on textured or non-homogeneous images, and also may produce accurate mattes for regular images with smooth foreground and background regions; the discriminative matting technique is a well-balanced algorithm which may have a broader application range than conventional methods. A significant component of the discriminative matting technique as described herein is applying a discriminative color analysis which is able to pick out only truly-mixed pixels for alpha estimation. In one embodiment, the discriminative color analysis may be applied only on individual pixels, and thus may encounter limitations when the foreground and background colors are non-separable in the 3D color space. In other embodiments, additional features may be extracted from local image patches and feature analysis may be expanded into higher dimensional space, where the foreground and background regions may be more separable; thus these embodiments may more readily deal with complicated texture patterns and color distributions.

Implementation

Figure 15:
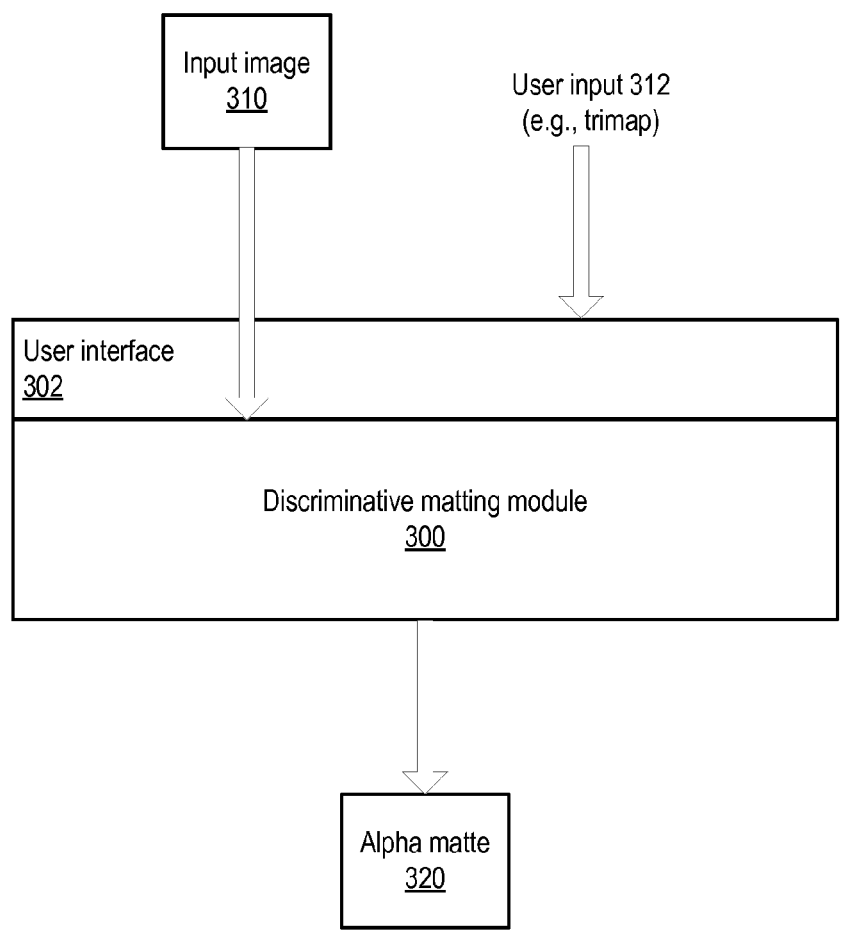
FIG. 15 illustrates an example embodiment of a discriminative matting module that may implement embodiments of the discriminative matting technique.

FIG. 15 illustrates one embodiment of a discriminative matting module that may implement embodiments of the discriminative matting technique described herein. Embodiments of the discriminative matting technique may be implemented as or in a discriminative matting module 300 as illustrated in FIG. 15. Module 300 may provide a user interface 302 that includes one or more user tools via which a user may interact with, direct, and/or control the discriminative matting process performed by module 300. Module 300 may obtain an image 310 or region of an image and user input 312, e.g. a trimap, and perform discriminative matting on the image accordingly as described herein to produce an alpha matte 320 for the input image 310. While this Figure shows the trimap as user input, it is to be noted that trimaps may be obtained in other ways. For example, an image segmentation, border tracing, or object location technique may generate a trimap, or may generate data that may be used to automatically generate a trimap. The alpha matte 320 may be used in various digital image processing functions on the image 310 or versions of the image 310.

Module 300 may be implemented as or in a stand-alone application or as a module of or plug-in for a graphics application or graphics library that may provide other graphical/digital image processing tools. Examples of types of applications in which embodiments of module 300 may be implemented include, but are not limited to, scientific, medical, painting, publishing, digital photography, video editing, games, animation, and/or other applications in which digital image processing may be performed. Specific examples of application in which embodiments may be implemented include, but are not limited to, Adobe® Photoshop® and Adobe® Illustrator®. In addition to generating alpha matte 320, module 300 may display (e.g., to display(s) 780 of FIG. 16), manipulate, modify, and/or store the alpha matte to a memory medium such as a storage device or storage medium. In addition or alternatively, module 300 may output the alpha matte 320 to one or more other image processing modules that may then apply the alpha matte in an image processing technique or techniques implemented by the other module(s).

Example System

Figure 16:
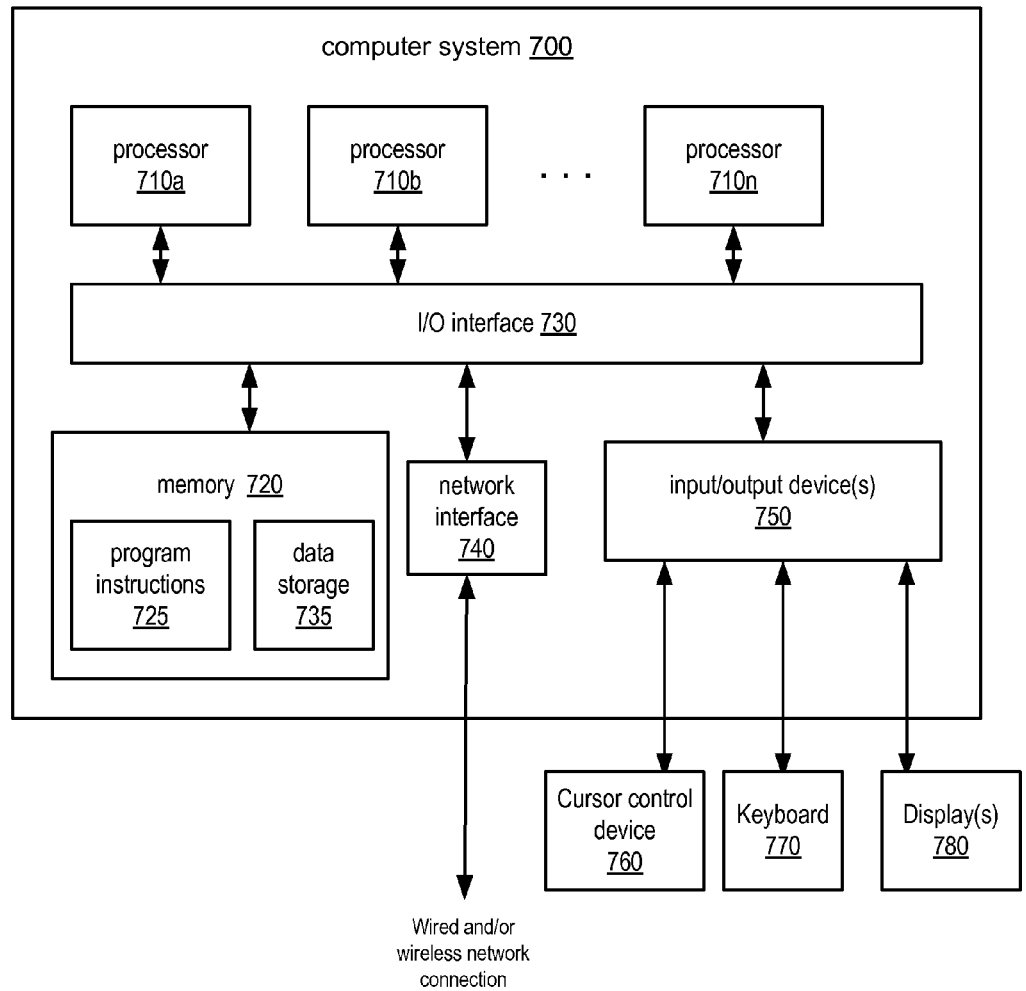
FIG. 16 illustrates an example computer system that may be used in embodiments.

Various components of embodiments of a discriminative matting technique, implemented as a discriminative matting module, may be executed on one or more computer systems, which may interact with various other devices. One such computer system is illustrated by FIG. 16. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a discriminative matting module, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 16, memory 720 may include program instructions 725, configured to implement embodiments of a discriminative matting module as described herein, and data storage 735, comprising various data accessible by program instructions 725. In one embodiment, program instructions 725 may include software elements of a discriminative matting module as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a discriminative matting module as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    estimating an alpha value for each pixel in an unknown region of an image;
    generating a probability map for the unknown region, wherein the probability map includes a mixture probability estimation for every pixel in the unknown region;
    classifying the pixels in the unknown region into boundary pixels and non-boundary pixels according to the probability map;
    classifying the non-boundary pixels as either foreground pixels or background pixels, wherein a foreground alpha value is assigned to the foreground pixels and a background alpha value is assigned to the background pixels;
    refining the estimated alpha values for the boundary pixels, wherein the estimated alpha values for the boundary pixels indicate a value between the foreground alpha value and the background alpha value; and
    outputting an alpha matte for the image, wherein the alpha matte indicates the alpha value for all pixels in the image.

2. The computer-implemented method as recited in claim 1, further comprising smoothing the probability map prior to said classifying.

3. The computer-implemented method as recited in claim 2, wherein said smoothing is performed according to an adaptive spatial smoothing technique.

4. The computer-implemented method as recited in claim 1, further comprising estimating a binary segmentation value for each pixel in the unknown region of the image.

5. The computer-implemented method as recited in claim 4, wherein said estimating an alpha value, said estimating a binary segmentation value, and said generating a probability map are performed according to discriminative color analysis.

6. The computer-implemented method as recited in claim 1, wherein the foreground alpha value is 1, and the background alpha value is 0.

7. The computer-implemented method as recited in claim 1, further comprising receiving a trimap for the image, wherein the trimap indicates a segmentation of the image into a foreground region including known foreground pixels, a background region including known background pixels, and the unknown region.

8. The computer-implemented method as recited in claim 1, further comprising repeating said generating a probability map, said classifying the pixels in the unknown region into boundary pixels and non-boundary pixels according to the probability map, said classifying the non-boundary pixels as either foreground pixels or background pixels, and said refining the estimated alpha values for the boundary pixels until convergence of the alpha matte.

9. The computer-implemented method as recited in claim 1, wherein said classifying the non-boundary pixels as either foreground pixels or background pixels comprises, for each non-boundary pixel, comparing the pixel to one or more neighbor pixels using a differencing technique that compares multiple pixel features.

10. The computer-implemented method as recited in claim 9, wherein the multiple pixel features include color, texture and position.

11. The computer-implemented method as recited in claim 1, wherein said outputting an alpha matte for the image comprises storing the alpha matte to a memory medium.

12. The computer-implemented method as recited in claim 1, wherein said outputting an alpha matte for the image comprises graphically displaying the alpha matte on a display device.

13. A system, comprising:
   at least one processor; and
   a memory comprising program instructions, wherein the program instructions are executable by the at least one processor to implement a discriminative matting module configured to:
      estimate an alpha value for each pixel in an unknown region of an image;
      generate a probability map for the unknown region, wherein the probability map includes a mixture probability estimation for every pixel in the unknown region;
      classify the pixels in the unknown region into boundary pixels and non-boundary pixels according to the probability map;
      classify the non-boundary pixels as either foreground pixels or background pixels, wherein a foreground alpha value is assigned to the foreground pixels and a background alpha value is assigned to the background pixels;
      refine the estimated alpha values for the boundary pixels, wherein the estimated alpha values for the boundary pixels indicate a value between the foreground alpha value and the background alpha value; and
      output an alpha matte for the image, wherein the alpha matte indicates the alpha value for all pixels in the image.

14. The system as recited in claim 13, wherein the discriminative matting module is configured to smooth the probability map prior to said classifying.

15. The system as recited in claim 14, wherein, to smooth the probability map, the discriminative matting module is configured to apply an adaptive spatial smoothing technique.

16. The system as recited in claim 13, wherein the discriminative matting module is configured to estimate a binary segmentation value for each pixel in the unknown region of the image.

17. The system as recited in claim 16, wherein the discriminative matting module is configured to apply discriminative color analysis to estimate the alpha value, estimate the binary segmentation value, and generate the probability map.

18. The system as recited in claim 13, wherein the foreground alpha value is 1, and the background alpha value is 0.

19. The system as recited in claim 13, wherein the discriminative matting module is configured to receive a trimap for the image, wherein the trimap indicates a segmentation of the image into a foreground region including known foreground pixels, a background region including known background pixels, and the unknown region.

20. The system as recited in claim 13, wherein the discriminative matting module is configured to repeat said generate a probability map, said classify the pixels in the unknown region into boundary pixels and non-boundary pixels according to the probability map, said classify the non-boundary pixels as either foreground pixels or background pixels, and said refine the estimated alpha values for the boundary pixels until convergence of the alpha matte.

21. The system as recited in claim 13, wherein, to classify the non-boundary pixels as either foreground pixels or background pixels, the discriminative matting module is configured to, for each non-boundary pixel, compare the pixel to one or more neighbor pixels using a differencing technique that compares multiple pixel features.

22. The system as recited in claim 21, wherein the multiple pixel features include color, texture and position.

23. The system as recited in claim 13, wherein the system further comprises a storage device, and wherein, to output an alpha matte for the image, the discriminative matting module is configured to store the alpha matte to the storage device.

24. The system as recited in claim 13, wherein the system further comprises a display device, and wherein, to output an alpha matte for the image, the discriminative matting module is configured to display the alpha matte on the display device.

25. A computer-readable storage medium storing program instructions, wherein the program instructions are computer-executable to implement:
   estimating an alpha value for each pixel in an unknown region of an image;
   generating a probability map for the unknown region, wherein the probability map includes a mixture probability estimation for every pixel in the unknown region;
   classifying the pixels in the unknown region into boundary pixels and non-boundary pixels according to the probability map;
   classifying the non-boundary pixels as either foreground pixels or background pixels, wherein a foreground alpha value is assigned to the foreground pixels and a background alpha value is assigned to the background pixels;
   refining the estimated alpha values for the boundary pixels, wherein the estimated alpha values for the boundary pixels indicate a value between the foreground alpha value and the background alpha value; and
   outputting an alpha matte for the image, wherein the alpha matte indicates the alpha value for all pixels in the image.

26. The computer-readable storage medium as recited in claim 25, wherein the program instructions are computer-executable to implement smoothing the probability map prior to said classifying.

27. The computer-readable storage medium as recited in claim 26, wherein the program instructions are computer-executable to implement performing said smoothing according to an adaptive spatial smoothing technique.

28. The computer-readable storage medium as recited in claim 25, wherein the program instructions are computer-executable to implement estimating a binary segmentation value for each pixel in the unknown region of the image.

29. The computer-readable storage medium as recited in claim 28, wherein the program instructions are computer-executable to implement performing said estimating an alpha value, said estimating a binary segmentation value, and said generating a probability map according to discriminative color analysis.

30. The computer-readable storage medium as recited in claim 25, wherein the foreground alpha value is 1, and the background alpha value is 0.

31. The computer-readable storage medium as recited in claim 25, wherein the program instructions are computer-executable to implement receiving a trimap for the image, wherein the trimap indicates a segmentation of the image into a foreground region including known foreground pixels, a background region including known background pixels, and the unknown region.

32. The computer-readable storage medium as recited in claim 25, wherein the program instructions are computer-executable to implement repeating said generating a probability map, said classifying the pixels in the unknown region into boundary pixels and non-boundary pixels according to the probability map, said classifying the non-boundary pixels as either foreground pixels or background pixels, and said refining the estimated alpha values for the boundary pixels until convergence of the alpha matte.

33. The computer-readable storage medium as recited in claim 25, wherein, in said classifying the non-boundary pixels as either foreground pixels or background pixels, the program instructions are computer-executable to implement, for each non-boundary pixel, comparing the pixel to one or more neighbor pixels using a differencing technique that compares multiple pixel features.

34. The computer-readable storage medium as recited in claim 33, wherein the multiple pixel features include color, texture and position.

35. The computer-readable storage medium as recited in claim 25, wherein, in said outputting an alpha matte for the image, the program instructions are computer-executable to implement storing the alpha matte to a memory medium.

36. The computer-readable storage medium as recited in claim 25, wherein, in said outputting an alpha matte for the image, wherein the program instructions are computer-executable to implement graphically displaying the alpha matte on a display device.

37. A computer-implemented method, comprising:
  executing instructions on a specific apparatus so that binary digital electronic signals representing an unknown region of an image are analyzed to estimate an alpha value for each pixel in the unknown region;
  executing instructions on said specific apparatus so that binary digital electronic signals representing a probability map are generated for the unknown region, wherein the probability map includes a mixture probability estimation for every pixel in the unknown region;
  executing instructions on said specific apparatus so that binary digital electronic signals representing the pixels in the unknown region are classified into boundary pixels and non-boundary pixels according to the probability map;
  executing instructions on said specific apparatus so that binary digital electronic signals representing the non-boundary pixels are classified as either foreground pixels or background pixels, wherein a foreground alpha value is assigned to the foreground pixels and a background alpha value is assigned to the background pixels;
  executing instructions on said specific apparatus so that binary digital electronic signals representing the estimated alpha values for the boundary pixels are refined, wherein the estimated alpha values for the boundary pixels indicate a value between the foreground alpha value and the background alpha value; and
  storing an alpha matte for the image in a memory location of said specific apparatus for later use, wherein the alpha matte indicates the alpha value for all pixels in the image.

* * * * *